Patented June 3, 1952

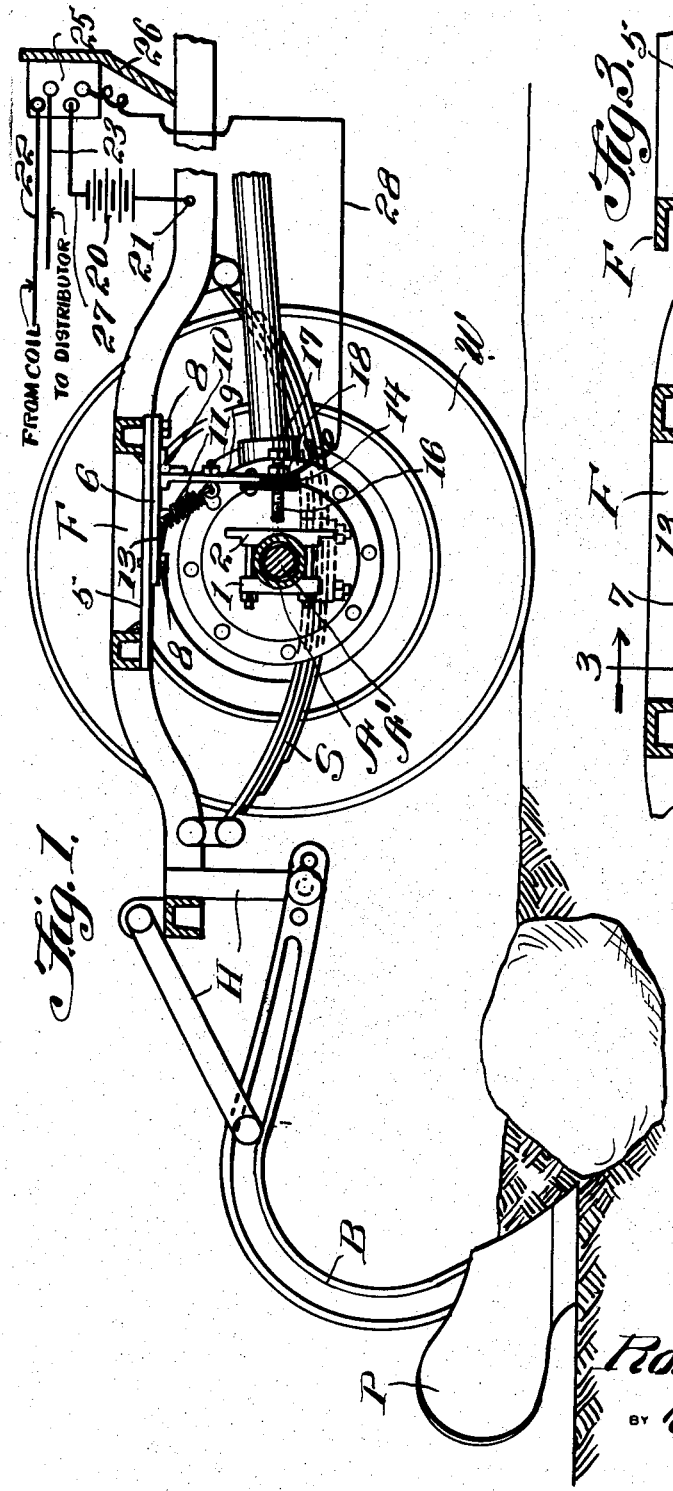

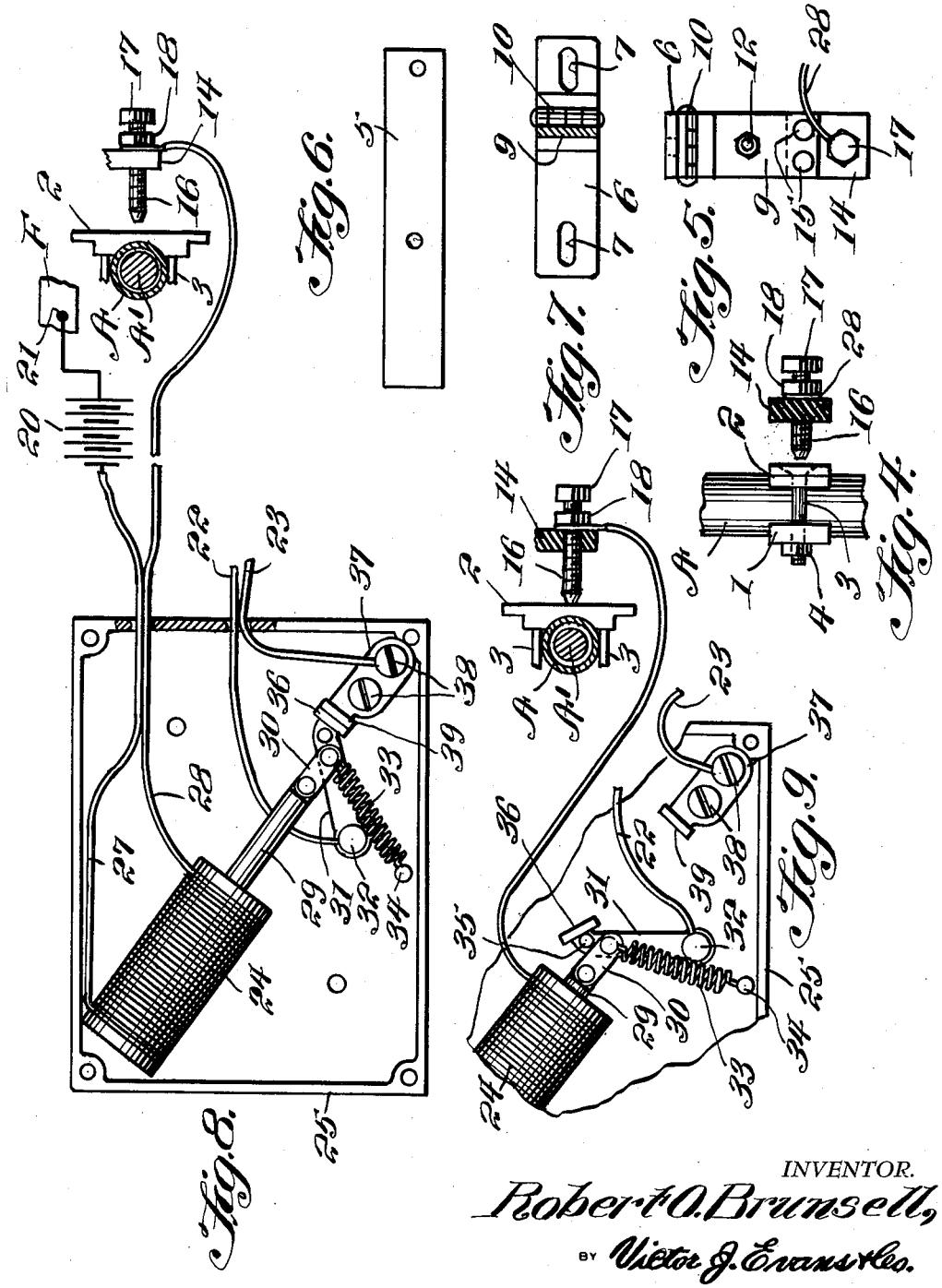

2,598,757

UNITED STATES PATENT OFFICE 2,598,757

ELECTRIC STOP MECHANISM FOR JEEPS

Robert O. Brunsell, Evansville, Wis.

Application March 30, 1949, Serial No. 84,381

2 Claims. (Cl. 180—82)

My present invention relates to the general class of electrically operated safety devices for motor vehicles and more specifically to an improved electric stop mechanism for jeeps which while well adapted for various purposes and uses is especially designed for installation and use with automotive vehicles propelled by power from an internal combustion engine and equipped for towing a plow or other agricultural implement. The primary object of the invention is the provision of safety devices included in the electrical control system for the vehicle engine for automatically stopping the engine when the vehicle encounters an obstruction that imposes an overload on its progress. As herein illustrated and described, when a plow drawn by the motor vehicle encounters an underground and unyielding obstruction, as a stone, the movement of the vehicle frame and plow is halted, relative movement of an axle and its wheels is instrumental in automatically activating the electrical safety mechanism, and the electrical ignition circuit of the motor is opened to render the motor inoperative.

After the obstruction has been overcome, the ignition system of the motor may manually be restored to operative condition.

The auxiliary safety mechanism includes a minimum number of parts that may be manufactured with facility and low cost of production, and the parts may be assembled with convenience and installed within the electrical operating system of the vehicle with a minimum expenditure of time and labor.

The invention consists in certain novel features of construction and combinations and arrangements of parts as will hereinafter be described and more particularly set forth in the appended claims.

In the accompanying drawings I have illustrated a complete example of an installation of the invention in which the parts are combined and arranged in accord with one mode I have devised for the practical application of the principles of the invention. It will however be understood that changes and alterations are contemplated and may be made in these exemplifying drawings, and mechanical as well as electrical structures, within the scope of my claims without departing from the principles of the invention.

Figure 1 is a composite view in section and elevation showing so much of a four wheel motor vehicle as is necessary to illustrate the invention.

Figure 2 is a vertical sectional detail view; and Figure 3 is a sectional view at line 3—3 of Fig. 2.

Figure 4 is a detail view of the safety switch or circuit maker; and Figures 5, 6, 7, are detail parts of the safety switch.

Figure 8 is an electrical diagram of the operating system of the motor vehicle with the safety appliances included therein; and Figure 9 is an electrical diagram showing the safety switch closed and the circuit breaker open.

In order that the general arrangement and utility of parts may readily be understood I have indicated in Fig. 1 portions of a motor vehicle including a wheel W, the frame F and the axle housing A for the rear axle A', with the leaf spring S resiliently and yieldably supporting the frame above the axle. The vehicle is pulling or towing a plow P, having a beam B that is pivotally supported from the frame by a hanger H, and it will be apparent that when the plow is obstructed by the stone, as indicated, the forward movement of the frame and plow is halted, and under inertia, the resiliently mounted axle and wheel will have a relative forward movement with respect to the frame. This slight forward movement of the axle is instrumental in activating the safety mechanism for the purpose of rendering inoperative the motor of the vehicle.

In this form of the invention the safety switch or normally open circuit maker coacts with the rear axle of the vehicle, but it will be understood that the front axle of a four-wheel motor vehicle may be utilized if desired.

The safety switch, or normally open circuit maker that is included in the electrical operating system of the vehicle comprises a movable contact made up of a back plate 1 and a front contact plate 2, and these plates are clamped on the axle housing by bolts 3 and nuts 4, to provide a ground connection in the electrical system.

The relatively stationary contact member of the safety switch is suspended from the frame directly in front of the movable contact member and in its path of movement. For this purpose a frame plate 5 is welded to the frame F, and an adjustable base plate 6 having spaced and alined slots 7 is attached as by bolts 8 to the frame plate, the bolts being employed to fix the base plate in adjusted position.

A switch plate 9 is suspended by hinge 10 from the base plate, and a spring 11 is fastened at its ends by eye-bolts 12 and 13 to the switch plate and the adjustable base plate respectively, to retain the base plate in correct upright position.

The lower free end of the hinged switch plate is insulated, as at 14, and rivets 15 are utilized to fasten the insulation to the switch plate, and an adjustable contact screw 16 is mounted in the insulated part of the switch plate, said screw being provided with a head 17 and a lock nut 18.

By means of these adjustable parts the movable contact 2 and the relatively stationary contact 16 of the safety switch may accurately be adjusted as a normally open circuit maker that is closed by movement of the member 2.

In Figs. 1 and 8, parts of the electrical control system of the vehicle are indicated, with a battery 20 grounded at 21 on the frame F, with coil wire 22 and distributer wire 23 provided with extensions 22' and 23' to the normally closed circuit breaker assembly that includes a solenoid or electromagnet 24 mounted in a casing or box 25 that is fastened in a convenient part of the vehicle, as on the dash board or instrument panel 26, where it is readily accessible to the driver or operator of the vehicle.

The solenoid is equipped with an operating circuit, as wires 27 and 28 connected in the electrical system, and this circuit is energized, when the safety switch is closed, to activate the solenoid and thereby open the normally closed circuit breaker.

For opening the circuit breaker, the solenoid is equipped with a reciprocable core or armature 29 that is pivotally attached by link 30 to a switch arm 31 that is pivoted at 32 within the box or casing 25, and the pivot 32 forms a terminal for the wire 22'. An off-center spring 33 is anchored at 34 in the box and connected to the junction of the link and arm 31 for retaining the arm in off-center position, and the arm is provided with a stop pin 35 and a contact point 36, the latter forming the movable contact of the normally closed circuit breaker.

For coaction with the movable contact of the circuit breaker, a terminal plate 37 is attached by screws 38 to the interior of the box 25, and the wire 23' is connected to one of the screws as a terminal. The fixed plate 37 is fashioned with an upturned blade 39 that forms a stationary contact for coaction with the contact 36, and the spring 33, while the solenoid is deenergized, holds the two contacts in frictional engagement.

When the emergency or safety switch is closed, the solenoid is energized to pull open the closed circuit maker and the spring snaps the switch arm to position of Fig. 9 where the arm is resiliently held in open position with the ignition circuit broken.

For restoring the ignition system to working condition, the switch arm is manually swung to frictionally engage the contacts 36 and 39 and the off center spring then holds the circuit breaker in closed position.

Having thus full described my invention, what I claim as new and desire to secure by Letters Patent is:

1. In an electrical control system for an automotive vehicle, the combination with an axle, a frame, a yieldable spring uniting the axle and frame, and an electrical contact plate mounted on the axle, of a switch plate pivotally suspended from the frame in horizontal alignment with and forward of said contact plate and resilient means for holding the switch plate in operative position, and an insulated contact screw mounted in the switch plate in the path of forward horizontal movement of the contact plate.

2. In an electrical control system for an automotive vehicle, the combination with an axle, a frame, a yieldable spring between the axle and the frame, and an electrical contact plate mounted on the axle, of an adjustable supporting plate on the frame and means for adjusting said plate, a switch plate in horizontal alignment with and forward of said contact plate pivotally suspended from the supporting plate and a spring connecting the supporting plate and switch plate, and an insulated contact screw mounted on the switch plate in the path of the forward horizontal movement of the contact plate.

ROBERT O. BRUNSELL.

REFERENCES CITED

The following references are of record in the file of this patent:

UNITED STATES PATENTS

| Number | Name | Date |
|---|---|---|
| 1,122,797 | Osterhoudt | Dec. 29, 1914 |
| 1,206,953 | Wales | Dec. 5, 1916 |
| 1,454,957 | Cockrill | May 15, 1923 |
| 2,192,262 | Griesedieck | Mar. 5, 1940 |
| 2,385,779 | Evans | Oct. 2, 1945 |